United States Patent Office 2,884,829
Patented May 5, 1959

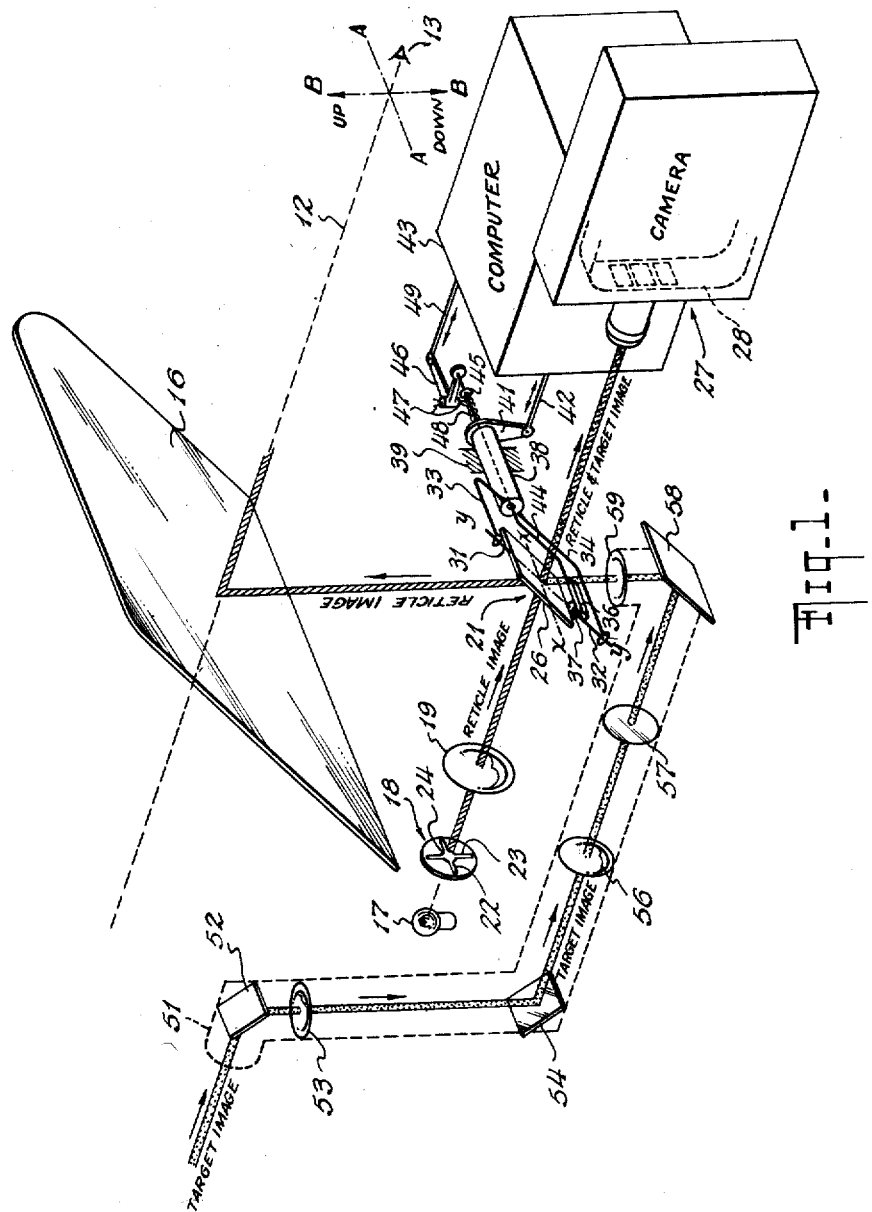

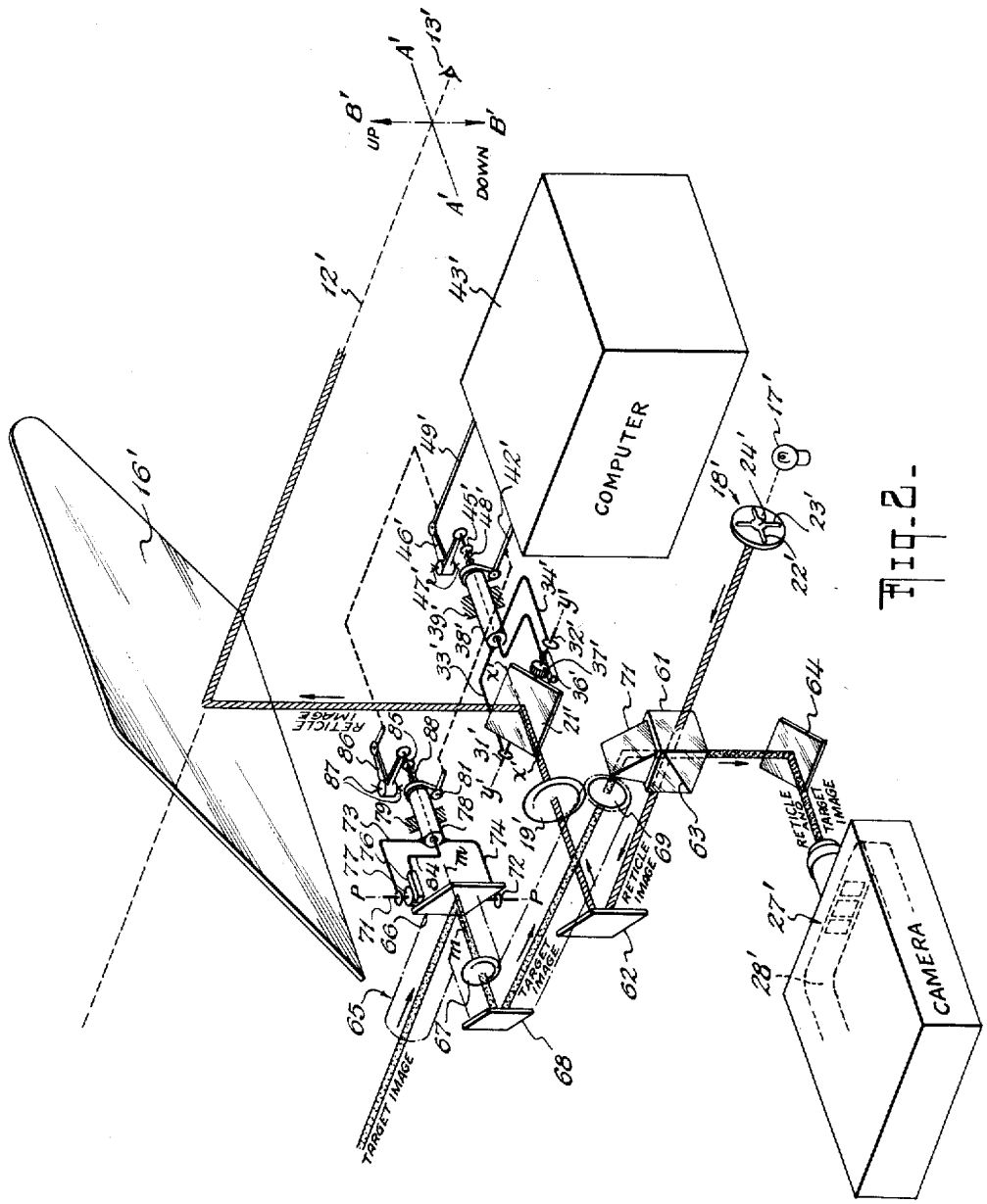

2,884,829

AUXILIARY OPTICAL SYSTEMS FOR USE WITH COMPUTING GUN SIGHTS

Donald A. Davies, Garden City, N.Y., and John O. Lalli, Santa Monica, Calif., assignors to Sperry Rand Corporation, a corporation of Delaware Application January 14, 1955, Serial No. 482,134

6 Claims. (Cl. 88—1)

The present invention relates to computing gun sights. It is particularly concerned with systems for providing information for analyzing the ability of a gun sight operator to accurately track a target with the tracking reticle image of a computing gun sight of the displaced line of sight type.

The tracking reticle image of a computing gun sight is made to appear at infinity in front of an eye of a gun sight operator manipulating the direction of guns to be fired. If no lead angle were required for a gun or guns whose direction of fire is to be controlled to score hits upon a selected target, the reticle image would appear along a zero deflection line of sight for the optical system of the gun sight, i.e., a line of sight with respect to which the bore sight axes of the guns are maintained in fixed parallel or substantially parallel relationship. Thus, when the target is aligned with the reticle image the guns are properly oriented so that projectiles therefrom would hit the target.

The tracking reticle image of a computing gun sight as aforedescribed becomes displaced from the aforementioned zero line of sight when a target is being tracked which requires that the guns lead the target. The displacement angles of azimuth and/or elevation of the reticle image with respect to the zero line of sight in an orthogonal system of azimuth and elevation coordinates are regulated by the computing gun sight in a manner know in the art. Such angles are generally referred to as prediction angles. Sometimes a tracking reticle image may be displaced by as much as 12 degrees from the zero line of sight so that when the reticle image and target are aligned the guns will properly lead the target for scoring hits thereupon.

A motion picture camera mounted in the vicinity of a gun sight operator's head in proximity with the zero line of sight of a computing gun sight may be provided for recording pictures of a target and the tracking reticle image just as viewed by the operator. Such pictures may be utilized for analyzation of the operator's ability to accurately track a target. Also, it may be desirable to provide a record of target damage.

The field of view of a camera is an inverse function of the focal length of the camera lens since the camera film size is fixed. Therefore, the focal length of a camera mounted along the zero line of sight of a computing gun sight is limited to a certain value so as to be able to take pictures of the target and the tracking reticle image when displaced by a maximum prediction angle.

A motion picture camera having a film size of 16 millimeters may be employed as externally applied accessory equipment with a computing gun sight as aforedescribed. If such a camera were mounted along the zero line of sight of the gun sight, the maximum focal length for the camera lens so as to have a field of view wide enough to photograph a tracking reticle image displaced in any direction from the zero line of sight by a typical maximum prediction angle of twelve degrees would be approximately 25 millimeters. Such a focal length is so short that the recorded image of a target at typical gun fire ranges for fighter aircraft, for example, are extremely minute. Sometimes the target image is so small that the film is useless since the orientation of the target and/or damage thereto cannot be readily determined from the pictures.

Increasing the focal length of the camera lens would enlarge the size of the target on the film but would cause the field of view of the camera to be decreased. Therefore, a camera mounted as aforedescribed and adapted to have a larger focal length would not provide pictures of the tracking reticle image when caused by the computing gun sight to be displaced by a maximum or near maximum prediction angle. Thus, the gun sight operator could be actually tracking a target properly so as to keep it aligned with the tracking reticle image and the camera would be unable to record pictures thereof. Likewise, conditions could exist where the operator might be tracking a target improperly so as not to keep the reticle image and target aligned and no pictures of the reticle and/or target would appear on the film for illustrating his tracking error.

The fact that a camera utilized as aforedescribed is required to be in the vicinity of the gun sight operator's head is a further disadvantage since his visibility is partially blocked. In a situation where the pilot of an aircraft is also operator of the gun sight, the foregoing obscurement of vision jeopardizes the safety of the pilot and the aircraft.

It is an object of the present invention to provide a gun sight system wherein an image of a selected target is provided about an axis displaced in fixed relationship relative to a zero line of sight for the system, said image having the same relationship relative to a fixed reference reticle configuration provided along said axis as observed from one reference position as the relationship observed from a different reference position between the selected target and a gun sight tracking reticle image whose orientation about said zero line of sight is regulated in accordance with azimuth and elevation gun prediction angle information.

It is a further object of the present invention to provide a system as aforedescribed so that a relatively long focal length motion picture camera can be employed therewith along the aforementioned axis displaced from the zero line of sight for providing high quality pictures of the target image and a fixed reticle configuration provided in the form of a reticle image of light, for example.

It is yet another object of the present invention to provide a system as aforedescribed wherein such a motion picture camera can be located in a remote position from the head of the gun sight operator so as not to obscure his vision.

The foregoing and other objects of the present invention which will become apparent to those skilled in the art are attained by providing a computing gun sight of the displaced line of sight type which includes an auxiliary optical system in combination with a basic optical system comprising adjustable prediction mirror means connected to a computer for regulating the orientation of a tracking reticle image provided by the computing gun sight. The auxiliary optical system comprises means including a periscope maintained in fixed relationship relative to a zero line of sight of the basic optical system, the periscope comprising means for viewing a selected target so as to provide a target image about a fixed axis of the auxiliary system when the target is tracked by a gun sight operator with the tracking reticle image. The periscope is adapted to have a wide field of view so as to provide the aforementioned target image even when the target is aligned with a tracking reticle image of the computing gun sight which has been displaced by a maximum computed prediction angle from a zero line of sight for the system.

The auxiliary optical system includes further adjustable mirror means, which may comprise the back side of a prediction mirror provided in the basic optical system of the computing gun sight, or a completely separate mirror whose orientation is synchronized by adjustable mechanical means with the aforementioned prediction mirror of the basic optical system, for example. The further adjustable mirror, in either case, is adapted to effectively subtract any angle of displacement of the tracking reticle image relative to the zero line of sight from the angle of displacement of the selected target relative to said zero line of sight so that the target image provided about the aforementioned fixed axis of the auxiliary optical system always has the same relative relationship with a fixed reference reticle configuration as observed from a predetermined reference position as the relationship between the selected target and tracking reticle image as observed by the gun sight operator from a different predetermined reference position.

Referring to the drawings,

Fig. 1 is a schematic illustration of a first embodiment of the present invention illustrating the basic optical system of a computing gun sight of the displaced line of sight type and an auxiliary optical system provided therewith for attaining the objectives of the present invention, and Fig. 2 is a schematic illustration of an alternative embodiment of the present invention illustrating a different arrangement for the basic optical system for a computing gun sight of the displaced line of sight type and a different auxiliary optical system provided therewith for attaining the objectives of the present invention.

In Fig. 1, line 12 represents a zero deflection line of sight for the computing gun sight system. A gun or guns, not shown, should be located in proximity with the gun sight system so that their axes are parallel or substantially parallel with line 12. A pair of coordinates A—A and B—B shown in Fig. 1 intersect line 12 in a plane at right angles therewith, the coordinates A—A and B—B being parallel to elevation and azimuth axes, respectively, of the aforementioned gun or guns.

All of the components of the gun sight system illustrated in Fig. 1 comprise part of a structure sometimes referred to as a sight head, the sight head and guns being adapted to be supported upon an aircraft in fixed relationship to each other and the aircraft, for example. In a case where the sight head and guns are movable relativeto the craft on which they are mounted, the guns would be slaved to the sight head by fixing them to a common movable base, or by utilizing a servo system therebetween where there is no such common base so that the bore-sight axes of the guns will be kept in substantially parallel relationship with the zero line of sight 12.

A gun sight operator is positioned so that one of his eyes 13 at a first predetermined reference position along the zero line of sight 12 views a selected target such as another aircraft 14 through a flat clear plate of glass 16 of the sight head. Glass 16, generally referred to as a combining glass, is transversely supported relative to the zero line of sight 12, which line passes through a predetermined point at the center of the glass, for example. The glass 16 is inclined toward the gun sight operator's eye 13 so as to form a 45 degree angle with line 12, for example, in a plane including this line and the illustrated B—B axis. The angles formed between glass 16 and line 12 in a plane including this line and the illustrated A—A axis are 90 degrees.

A source of light comprising lamp 17 is supported in back of a reticle 18 located at the focal point of a projection lens 19 for projecting a reticle image to an orientable prediction mirror 21 directly below the combining glass 16. The reticle 18 and lens 19 are coaxial with the center of mirror 21 along a line parallel with the zero line of sight 12. If a line between the centers of glass 16 and mirror 21 is at right angles with the line 12 in a plane including line 12 and the B—B axis, a tracking reticle image will be reflected from glass 16 so as to be coaxial with line 12 when the plane of mirror 21 is parallel with the plane of glass 16.

The reticle 18 comprises a flat disc which is opaque to light from source 17 except for coordinate rectangular slots 22 and 23 and a circular slot 24 coaxial with slots 22 and 23, for example. The path for reticle light rays transmitted from a point at the center of reticle slot 24 which pass through a central region of lens 19 to mirror 21, for example, is illustrated in Fig. 1. The actual reticle light rays from the aforementioned point to lens 19 are not parallel with each other until after passage through lens 19.

The lens 19 comprises a multi-element lens which is preferably a doublet or triplet lens for reducing spherical and chromatic aberration. Lens 19 functions as a simple double-convex lens in accordance with principles known in the art. Since the reticle 18 is located at the focal point of lens 19, all light rays from any given point within reticle slots 22—24 are collimated by the lens. Reticle light rays reflected upward from mirror 21 travel along a first transmission path for reflection from glass 16 and form a light image of the reticle slots 22—24 which appears to the eye 13 to be at infinity beyond the combining glass 16. This image is referred to as a tracking reticle image, and is orientable relative to the zero line of sight 12 in accordance with the orientation of prediction mirror 21. The aforementioned components comprise the basic optical system of the computing gun sight.

The prediction mirror 21 is comprised of a thin flat glass plate with a film 26 of aluminum, for example, lightly coated upon the surface of the plate nearest the lens 19, for example. It is apparent that the film 26 could instead be coated on the opposite surface of the glass plate. The aluminum film 26 renders the mirror 21 semi-transparent so that some of the reticle light rays from lens 19 are reflected upward along the aforementioned first transmission path to glass 16 and some are transmitted through the mirror 21 along a second transmission path to a camera 27.

The lens axis of camera 27 is aligned with a fixed axis of the reticle light rays which pass through the semi-transparent prediction mirror 21. These light rays form a reference reticle configuration which is fixedly oriented about this fixed axis. Camera 27 is arranged at second predetermined reference position along the aforementioned fixed axis so that a reticle image will be recorded in concentric relationship with the center of each frame of a film strip 28. The reticle 18, lens 19, mirror 21 and camera 27 should be well removed from the zero line of sight 12 so as not to obstruct the field of view of the gun sight operator.

Coaxial arms 31 and 32 are affixed to opposite edges of mirror 21 so as to support the mirror 21 for rotation about a y—y axis through these arms. The arms 31 and 32 are supported by suitable bearings, not shown, upon gimbal means comprising yoke arms 33 and 34 so that the mirror 21 is freely rotatable about the aforementioned y—y axis. A reciprocatable rack 36 is provided for transverse linear displacement relative to the y—y axis for engaging a pinion 37 affixed to mirror arm 32 for causing the aforementioned rotation of mirror 21.

The yoke arms 33 and 34 are affixed to one end of a shaft 38 supported within a bearing 39 for rotation about an x—x axis through mirror 21 orthogonal to the aforementioned y—y axis thereof. The other end of shaft 38 is affixed to a crank 41 pivotally connected to a linearly displaceable arm 42 of a computer 43, so that the orientation of mirror 21 about the x—x axis thereof is a function of the position of computer arm 42.

A bent arm 44 having a linear portion extending through shaft 38 and crank 41 in coaxial relationship with the aforementioned x—x axis is provided for supporting the rack 36. The aforementioned portion of arm 44 is keyed to shaft 38 by means, not shown, so that arm 44 will rotate with shaft 38. Bearing means, not shown, are provided within shaft 38 so that arm 44 can be displaced along the illustrated x—x axis without displacement of shaft 38 and crank 41.

An end of arm 44 beyond a collar 45 affixed thereto engages a flattened end of a bell crank 46 pivoted at 47. Rotation of bell crank 46 causes linear translation of the arm 44 and rack 36. A spring 48 is provided between collar 45 and crank 41 so as to maintain the aforementioned end of arm 44 in engagement with the bell crank 46. The other end of bell crank 46 is pivotally connected to a further linearly displaceable arm 49 of the computer 43 for rotation of bell crank 46 about its pivots 47. Thus, the orientation of mirror 21 about the y—y axis thereof is a function of the position of computer arm 49.

The computer 43 may comprise any conventional gun sight computer known in the art for regulating the locations of arm such as 42 and 49 along their axes so that any displacements of said arms from predetermined zero reference locations will be functions of gun elevation and azimuth prediction angle information generated by the computer, respectively. The mirror 21 is orientable in accordance with this information so that the angles of reflection of the reticle light rays therefrom and the angles of incidence and reflection of said rays at combining glass 16 will be correct to properly regulate the orientation of the tracking reticle image relative to the zero line of sight 12. Thus, whenever a gun sight operator orients the gun sighting system or sight head so that a selected target and the tracking reticle image appear to be aligned, the zero line of sight 12 and the bore sight axis of a controlled gun or guns maintained parallel or substantially parallel therewith will lead the target by a proper angle.

Computer 43 may comprise, for example, a computer as shown and described in U.S. Patent 2,638,269, published May 12, 1953. The computer arms 42 and 49 herein correspond to similar computer arms for moving the two azimuth and elevation mirrors illustrated in the patent, the single mirror 21 herein performing the same function as both of the aforementioned mirrors of the patent.

The operation of the aforedescribed basic optical system and computer as shown in Fig. 1 is conventional in the art. Suppose, for example, that the guns to be controlled and the computing gun sight are fixed upon an aircraft where the pilot is the gun sight operator, the zero line of sight 12 and the bore sight axes of the guns being substantially parallel with the longitudinal axis of the aircraft. If a selected target such as another aircraft 14 is tracked and no lead angle is required for projectiles from the guns to score hits upon the target, there is no linear displacement of either computer arm 42 or computer arm 49 from their zero reference locations. Thus, if mirror 21 is properly oriented at zero reference positions about the x—x and y—y axes therethrough as in Fig. 1, light rays originating from a point at the center of reticle aperture 24 are reflected by mirror 21 and combining glass 16 so as to be coaxial with the zero line of sight 12. Therefore, the tracking reticle image will appear to be at infinity in coaxial alignment with line 12.

If the selected target 14 travels in such a manner and the pilot maneuvers his aircraft so that his guns must lead the target, the computer 43 determines the required lead angle and causes the computer arm 42 and/or the computer arm 49 to be linearly displaced from zero reference locations by amounts which are functions of elevation and azimuth prediction angle or gun lead angle information, respectively. Thus, mirror 21 is reoriented about either its x—x axis or its y—y axis or both in accordance with this information and light rays from the reticle 18 are reflected from combining glass 16 by different angles than before.

The projected angle to the plane of axis A—A and line 12 between a line of collimation of reflected reticle light rays originating from a point at the center of reticle slot 24 and the zero line of sight 12 is directly proportional to azimuth prediction angle information generated by computer 43. The projected angle to the plane of axis B—B and line 12 between a line of collimation of the aforementioned reflected light rays and the zero line of sight 12 is directly proportional to elevation prediction angle information. Therefore, if the pilot maneuvers his aircraft so as to align the center of the tracking reticle image with the center of target 14, the zero line of sight 12 and the bore sight axes of the controlled guns will properly lead the target in accordance with computer 43 information.

In one system as aforesdescribed, information from computer 43 can be generated for reorienting prediction mirror 21 so that a line of collimation of the light rays originating from a point at the center of slot 24 of reticle 18 and reflected by glass 16 forms azimuth or deflection prediction angles as large as ±12 degrees to the right or left of the zero line of sight. Such a computer can also generate elevation prediction angle information so that the aforementioned line of collimation can be angularly displaced so as to form with the zero line of sight 12 an angle of +3 degrees (in an upward direction) above the zero line of sight 12 or −12 degrees (in a downward direction) below line 12, for example.

It should be noted that the prediction mirror 21 in the system of Fig. 1 rotates about its x—x or y—y axes through angles one-half as large as the rotation of the reticle light rays reflected therefrom. Therefore, a four degree displacement of mirror 21 about either x—x axis or its y—y axis from a predetermined reference position results in an eight degree displacement of any point of the tracking reticle image in elevation or azimuth, respectively, from a predetermined reference position relative to the zero line of sight 12, for example. This occurs since rotation of a plane mirror upon which a ray of light falls causes the reflected ray to rotate also, the rotation of the reflected ray being twice that of the mirror.

Both of the faces of the semi-transparent mirror 21 are planar and parallel so that light rays from the reticle 18 which pass through the mirror will always travel in direction parallel with the corresponding light rays entering the mirror. This occurs regardless of any reorientation of mirror 21 by computer 43 so that an image of reticle 18 always appears in concentric alignment with the center of each frame of the camera film 28 as has been described. An auxiliary optical system comprising a periscope 51 and the face of the aluminum film 26 of mirror 21 closest to camera 27 is provided so that the camera 27 will also record an image of the selected target 14. This face forms a further adjustable mirror interconnected with prediction mirror 21.

The periscope 51 of the aforementioned auxiliary optical system is comprised of a planar collecting mirror 52 for receiving light from target 14 and reflecting it for travel along an optical path including an objective lens 53, a plane mirror 54, an erecting system comprising lenses 56, 57, a further plane mirror 58 and a periscope eye piece 59. The periscope is fixedly supported below the zero line of sight 12 in the plane of this line and the B—B axis for example, the periscope collecting mirror being located in proximity with the combining glass 16 just close enough to the line of sight 12 so as not to obscure the gun sight operator's view. The dotted path illustrated in Fig. 1 as passing through periscope 51 along optical axes thereof from the input end of the periscope to the camera 27 corresponds to the path for light from a target 14 when aligned with the zero line of sight 12. The axis at the input end of the periscope constitutes a first optical axis of the auxiilary optical system, which axis is in substantially fixed parallel relationship with the zero line of sight 12.

The mirrors 52, 54 and lens 53 are arranged along an optical periscope axis substantially at right angles with the zero line of sight 12. The opposing reflecting surfaces of mirrors 52 and 54 lie in parallel planes substantially at 45 degree angles with respect to the aforementioned axis. The end of periscope 51 containing mirror 52 faces out into space along a further periscope axis in fixed, substantially parallel relationship with the zero line of sight 12.

The mirrors 54, 58 and lenses 56, 57 are arranged along an optical periscope axis below prediction mirror 21 and substantially parallel with the zero line of sight 12, the plane of the reflecting surface of mirror 58 being parallel with the plane of combining glass 16. An optical periscope axis through periscope eye piece 59 and the center of mirror 58 is aligned with the center of the back side of mirror 21 at right angles with the aforementioned axis through the optical components 54—58.

The periscope 51 is adapted to have unity power, i.e., there is no magnification of a target image provided thereby. The periscope 51 should have a wide field of view so as to provide a complete target image even when the center of the target is displaced from the zero line of sight 12 by an amount slightly larger than a maximum prediction angle of 12 degrees in any direction.

The periscope objective lens 53 comprises a multi-element type of lens of the same general type as lens 19 in Fig. 1 so as to function as a simple double-convex lens, for example. A focal point of lens 53 should be at a point between mirror 54 and lens 56 along the common optical axis thereof.

The erecting lenses 56 and 57 comprise plano-convex lenses with their curved sides facing each other so as to form a two-lens erector system, for example. Lens 56 is arranged so that it has a focal point coincident with the aforementioned focal point of objective lens 53, lens 57 having a focal point between its plane surface and the mirror 58. Lenses 56 and 57 are provided for erecting an inverted target image provided by objective lens 53.

The periscope eyepiece 59 comprises a field lens and an eye lens, not shown, being conventional in the art. The eyepiece 59 should be arranged so that a focal point thereof is coincident with the aforementioned focal point of lens 57. Thus, light rays forming any point on a target image which are focused in the focal plane of lens 57 are collimated by eyepiece 59 and are incident upon the back surface of the aluminum film 26 provided on mirror 21 so as to be reflected therefrom and appear to be coming from infinity.

In operation of the complete system of Fig. 1, if mirror 21 is oriented at the position illustrated so that the tracking reticle image reflected by glass 16 is coaxial with the zero line of sight 12, and if the center of target 14 is aligned with the tracking reticle image, light from the center of target 14 passes through the periscope 51 and is reflected by the camera side of mirror 21 so as to be coaxial with the axis of camera 27 as is indicated in Fig. 1. If all other things including the orientation of mirror 21 remain fixed, and the center of target 14 were displaced with respect to the zero line of sight 12, the light from the center of target 14 would pass through the periscope system 51 and be projected at a different angle by eyepiece 53, thus, will be reflected from mirror 21 by a different angle than before. The net result is that the reticle and targe images provided on film strip 28 will be misaligned by the same amount as the tracking reticle image and targe as viewed by eye 13 are misaligned.

If mirror 21 is reoriented from its zero reference positions about its x—x and y—y axes in accordance with elevation and azimuth prediction angle information generated by computer 43, respectively, the tracking reticle image is reoriented about the zero line of sight 12 as has been described. For target light passing through periscope 51, reorientation of mirror 21 effectively causes the azimuth and elevation angles of displacement from the zero line of sight of the center of the tracking reticle image to be subtracted from any azimuth and elevation angles of displacement, respectively, of the center of target 14 relative to the zero line of sight 12. Therefore, whenever the center of target 14 is aligned with the center of the tracking reticle image seen by the eye 13, the target image provided by periscope 51 will always be reflected from mirror 21 so that the target image provided about the axis of camera 27 will be coaxially aligned with the fixed reticle image therealong, regardless of the orientation of the targe and tracking reticle image relative to the zero line of sight 12. Likewise, misalignment of the target and tracking reticle image as seen by eye 13 always results in the same misalignment of the target image and fixed reticle image provided on film strip 28.

It is apparent that the camera 27 is not required to have a wide field of view in order to photograph the target image reflected by mirror 21 and the fixed reticle image. Therefore, the camera may be designed to have a relatively long focal length so as to provide good magnification of the target image on the film strip 28.

Camera 27 may comprise a 16 millimeter motion picture camera using a 100-millimeter focal length lens of $f$ 2.8 aperture, for example. If the aforedescribed periscope 51 were not employed as disclosed herein, and a camera were mounted substantially along the zero line of sight 12 for recording pictures of a target and the tracking reticle image just as viewed by the gun sight operator, a 25 millimeter camera lens would be required so that the camera would record pictures of the tracking reticle image and target when displaced by the maximum prediction angles of $\pm 12$ degrees from the zero line of sight 12.

A 100-millimeter focal length camera records a target image of four times the size of the target image which would be recorded by a 25-millimeter focal length camera as mentioned. Therefore, high quality pictures of the target and damge thereto can be provided by the system disclosed herein. Furthermore, alignment or near alignment of the reticle image and target are indicated on the camera film 28 for the complete range of prediction angles of displacement of the tracking reticle image from the zero line of sight 12.

An alternative embodiment of the present invention is illustrated in Fig. 2. Components of the alternative system which are similar to those illustrated in the system of Fig. 1 are designated by primed reference numerals.

In the system of Fig. 2, light from a lamp 17' passing through slots 22'—24' of a reticle 18' is transmitted along an optical path through a cube of glass 61 to a planar mirror 62, from mirror 62 through a projection lens 19' to a completely reflecting planar prediction mirror 21', and thence upward to a flat combining glass 16' for reflection to eye 13'. A first transmission path for light rays originating from a point at the center of reticle slot 24' is illustrated in Fig. 2 as passing through central regions of cube 61 and lens 19'. The actual light rays from the aforementioned point to lens 19' are not parallel to each other and the illustrated path until after passage through lens 19', the reticle 18' being at a focal point of lens 19' as in the system of Fig. 1.

An optical axis of reticle 18', cube 61 and mirror 62 is parallel with the zero deflection line of sight 12'. An optical axis of mirror 62, lens 19' and mirror 21' is at right angles with the zero line of sight 12' in a plane parallel with and below the illustrated A'—A' axis of the system. The center of mirror 21' is directly below the center of combining glass 16', the mirror 21' being oriented in a slightly different manner than the corresponding mirror in the system of Fig. 1.

By proper arrangement of the foregoing components, the reticle image seen by eye 13' at a first reference position along the zero line of sight 12' passing through combining glass 16' can be made to be coaxial with the zero line of sight 12' as before, and appear at infinity on the other side of glass 16' from eye 13'. This occurs when the mirror 21' is oriented at a zero reference position so that the illustrated y'—y' axis through the centers of two opposite edges of mirror 21' is parallel to the zero line of sight 12' and so that the plane of the mirror is at a 45 degree angle with an orthogonal x'—x' axis through the center of mirror 21' in coaxial alignment with the axis of lens 19', for example.

The aforedescribed components illustrated in Fig. 2 comprise the basic optical system for the alternative computing gun sight. The orientation of the tracking reticle image in space as seen by the eye 13' is controlled by computer 43' in a manner similar to that discussed with reference to Fig. 1. Thus, when a selected target is aligned with the tracking reticle image, the bore sight axis of a gun or guns in proximity with the gun sight system will properly lead the target if maintained substantially parallel with the zero line of sight 12'.

The actual means for reorienting mirror 21' of Fig. 2 about the y'—y' axis therethrough is identical to the means in Fig. 1 for reorienting mirror 21 about its y—y axis. Any angular displacement of mirror 21' about its y'—y' axis causes the tracking reticle image seen by eye 13' to be displaced in azimuth by an angle twice that of the angular displacement of mirror 21'.

Since there is an orientation difference in the relationship of the x'—x' and y'—y' axes through mirror 21' of Fig. 2 and the relationship between this mirror and combining glass 16' as compared with the arrangement in Fig. 1, the relationship between crank 48' and computer arm 42' should be regulated so that the rate of angular displacement of crank 48' about the x'—x' axis is twice as large as in the system of Fig. 1. This is required since any angular displacement of mirror 21' about the x'—x' axis in Fig. 2 causes the reflected light rays therefrom and the tracking reticle image seen by eye 13' to be rotated by the same angle as that of mirror 21'.

The glass cube 61 is split between an upper edge of the cube nearest the reticle 18' and a lower edge of the cube nearest the mirror 62, thereby dividing the cube into two triangular prisms. A thin film of metal 63 such as aluminum is provided between the opposing faces of the aforementioned prisms so that part of the light from reticle 18' is reflected downward along a second transmission path and part is passed through cube 61 without deviation along an aforementioned first transmission path for reticle light to be incident upon mirror 62. Thus, cube 61 is semitransparent.

A mirror 64 is provided below cube 61 for receiving the reflected reticle light from the metallic film 63 dividing the cube 61. Mirror 64 reflects this light which forms a reference reticle configuration, to a motion picture camera 27' located at a second predetermined reference position for recording fixed reticle images at the centers of the frame of film strip 28'. The mirror 64 is a part of the auxiliary optical system of Fig. 2, the reference reticle image being fixedly oriented about an axis from mirror 64 through the lens of camera 27'.

The auxiliary optical system of the embodiment shown in Fig. 2 includes a periscope 65 having an auxiliary planar mirror 66 arranged to collect light from target 14' along an optical axis at the input end of the auxiliary optical system in proximity with and substantially parallel with the zero line of sight 12'. Mirror 66 reflects this light to a periscope objective lens 67 similar to lens 53 in the periscope 51 of Fig. 1, lens 67 being along an axis at right angles with the line 12'. A plane mirror 68 having its center coaxially aligned with the centers of lens 67 and mirror 66 is arranged to receive target light from lens 67 and reflect this light along an optical path including a field lens 69 and a triangular glass prism 71 supported on top of cube 61. Lens 69 is arranged to be closely adjacent prism 71.

Lenses 67 and 69 are arranged so that the plane of lens 69 is substantially coincident with the plane of the target image formed by the lens 67, i.e., is substantially at the focal point of lens 67. Lens 69 directs target light into prism 71 through a side of the prism perpendicular with the axis of lens 69 for reflection from the inclined side of prism 71 through cube 61 without deviation to mirror 64, and thence to the lens of camera 27'.

The field lens 69 comprises a plano-convex type lens with its plane side nearest prism 71, for example, and is utilized for increasing the illumination on the camera film 28' without increasing the size of the lens aperture of camera 27'. The lens of camera 27' should be located at a place where the light rays from field lens 69 along the aforedescribed optical path to camera 27' would form an image of a hypothetical object at the location of objective lens 67.

If the aforedescribed components of the periscope 65 are properly oriented, an image of the target 14' will be recorded on each frame of the film 28' in alignment with the reticle image at the center of each film frame anytime the target 14' and tracking reticle image seen by the gun sight operator's eye 13 are aligned.

The aforedescribed system illustrated in Fig. 2 is arranged so that the optical path length from the reticle 18' to the camera 27' is equal to the optical path length from the location of the target image formed by lens 67 at the field lens 69 to the camera 27'. This is required so that the target and reticle images on the film strip 28' are simultaneously in focus.

The focal length of the periscope objective lens 67 should be made equal to the focal length of the reticle projection lens 19'. Thus, the ratio of the size of the tracking reticle image enlarged by lens 19' and viewed by the gun sight operator's eye 13' to the size of reticle 18' equals the ratio of the size of the target viewed by the periscope collecting mirror 66 to the size of the target image diminished by periscope objective lens 67 and provided at periscope field lens 69. Therefore, since the optical paths from the reticle 18' and the field lens 69 to camera 27' are equal, the sizes of the reticle and target images recorded on film strip 28' will be in the same relationship as the apparent sizes of the tracking reticle image and target 14' as viewed by the eye 13'.

The mirror 66 is located at the base of the combining glass 16 in proximity with the zero line of sight 12. Mirror 66 is orientable about a p—p axis through the centers of opposite edges thereof, this axis being at a 90 degree angle relative to the y'—y' axis through prediction mirror 21'. Mirror 66 is also orientable about an orthogonal m—m axis through the center thereof, this axis being parallel with the x'—x' axis of mirror 21' and at right angles with the zero line of sight 12'. The mirror 66 should be properly oriented at zero reference positions about the m—m and p—p axes therethrough so that whenever a target 14' is aligned with the zero line of sight 12', the target image reflected from this mirror and transmitted to the camera 27' will be aligned with the optical axis of periscope 65 through lens 69 so as to be recorded at the center of each frame of the film strip 28'.

Coaxial arms 71 and 72 are affixed to two opposite edges of the auxiliary prediction mirror 66 in coincidence with the aforementioned p—p axis. The arms 71 and 72 are supported by suitable bearings, not shown, upon gimbal means comprising yoke arms 73 and 74 so that mirror 66 is freely rotatable about the p—p axis. A reciprocatable rack 76 is provided for transverse linear displacement relative to the aforementioned p—p axis for engaging a pinion 77 affixed to mirror arm 71 for causing the aforementioned rotation of mirror 66.

The yoke arms 73 and 74 are affixed to one end of a shaft 78 supported within a bearing 79 for rotation about the m—m axis coaxial with shaft 78. The other end of shaft 78 is affixed to a crank 81 connected by suitable linkages to computer arm 42' for transmitting displacements of computer arm 42' to the crank 81. Thus, mirror 66 is interconnected with mirror 21' and is synchronized for movement by crank 81 about the m—m axis with the movement of mirror 21' about its x'—x' axis, the angular displacements about these axes being equal to each other.

A bent arm 84 having a linear portion extending through shaft 78 and crank 81 in coaxial relationship with the aforementioned m—m axis is provided for supporting the rack 76. The aforementioned portion of arm 84 is keyed to shaft 78 by means, not shown, so that arm 84 will follow the rotation of shaft 78. Bearing means, not shown, are provided within shaft 78 so that arm 84 can be displaced along the m—m axis without displacement of shaft 78 and crank 81.

An end of arm 84 beyond a collar 85 affixed thereto engages a flattened end of a bell crank 86 pivoted at 87 so that rotation of bell crank 86 causes linear translation of the arm 84 and rack 76. A spring 88 is provided between collar 85 and crank 81 so as to maintain the aforementioned end of arm 84 in engagement with the bell crank 86. The other end of bell crank 86 is pivotally connected by suitable linkages to computer arm 49' for transmitting the displacements of computer arm 49' to the bell crank 86 for changing the angular position of the bell crank about its pivots 87 at the same rate as the rate of change of crank 46' about its pivots 47'. Thus, mirror 66 is also interconnected with mirror 21' so that movement of mirror 66 about its p—p axis is synchronized with the movement of mirror 21' about its y'—y' axis, angular displacements about these axes being equal to each other.

In operation of the system shown in Fig. 2, suppose that the target 14' is located in space so as to be out of alignment with a tracking reticle image coaxial with the zero line of sight 12', the mirrors 21' and 66 being oriented about the aforedescribed axes therethrough as illustrated in Fig. 2 with the computer arms 42' and 49' at zero reference positions. The image of the target provided on film strip 28' by the periscope 65 will be out of alignment with the reticle image on the film by the same relative amount as the target and tracking reticle image viewed by the eye 13' are out of alignment.

As the gun sight operator moves the gun sight head including the system shown in Fig. 2 to align the tracking reticle image with the target 14', computer 43 generates elevation and azimuth gun prediction angle information so as to reorient mirror 21' about the x'—x' and y'—y' axes therethrough in accordance with this information. Thus, the tracking reticle image is displaced from the zero line of sight 12' by a certain extent and direction determined by computer 43'. The mirror 66 is caused to be rotated about the m—m and p—p axes therethrough by identical angles of rotation of mirror 21' about its x'—x' and y'—y' axes, respectively. The rotation of mirror 66 causes the target image formed at periscope field lens 69 to shift in position relative to its axis so that when the operator aligns the tracking reticle image with the target 14', the aforementioned target image in the periscope 51 is returned to the optical axis of lens 69. Thus, the target image recorded on camera film strip 28' is brought back into alignment with the reticle image thereon at the center of each film strip frame, regardless of the displacement of the target from the zero line of sight 12'. If the target and tracking reticle image are not aligned with the gun sight operator's eye 13', the target image provided on film strip 28' will be out of alignment with the reticle image thereon by the same relative amount.

The camera 27' of Fig. 2 may also comprise a 16 millimeter camera having a relatively long focal length of 100 millimeters, for example, just as in the arrangement of Fig. 1. Thus, the target image provided on the film 28' is greatly magnified so as to provide clearly distinguishable images of selected targets for fighter aircraft, for example, no restriction being placed on the amount that the tracking reticle image and target might be displaced from the zero line of sight of the computing gun sight.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a combining glass, a reticle, means for transmitting an image of said reticle to said combining glass for observation from a first reference position fixed relative to said combining glass for tracking a target viewed through said combining glass, said means including an adjustable prediction mirror for orienting the position of said reticle image at said combining glass relative to a zero deflection line of sight passing from said first reference position through a predetermined point upon said combining glass, an auxiliary optical system for viewing the target and providing an image thereof for observation from a second reference position fixedly spaced from said first position, said auxiliary optical system having an input end whose optical axis is in substantially fixed parallel relationship with said zero deflection line of sight and an output end for presenting a target image for observation from said second reference position, and means included within said auxiliary optical system for subtracting the angular displacement between said tracking reticle image and said zero deflection line of sight from the angular displacement between the target and said optical axis at the input end of said auxiliary optical system, said means comprising a system for fixing the reticle image at said second reference position and a second adjustable prediction mirror interconnected with said first adjustable prediction mirror for orienting the position of said target image about said second reference position, whereby the orientation between a target image and said reticle image at the output end of said optical arrangement as observed from said second reference position corresponds with the orientation between the target and said tracking reticle image as observed from said first reference position.

2. In combination, a combining glass, a reticle, means for transmitting an image of said reticle to said combining glass for observation from a first reference position fixed relative to said combining glass for tracking a target viewed through said combining glass, said means including adjustable prediction mirror means for orienting the position of said reticle image viewed through said combining glass relative to a zero deflection line of sight passing from said first reference position through a predetermined point upon said combining glass, an auxiliary optical system for viewing the target and providing an image thereof for observation from a second reference position fixedly spaced from said first position, said auxiliary optical system having an input end having an optical axis in substantially fixed parallel relationship with said zero deflection line of sight and an output end for presenting a target image for observation from said second reference position, and means for providing a reference reticle configuration which is fixedly centered about an axis through said second reference position, said auxiliary optical system including further adjustable mirror means interconnected with said adjustable prediction mirror means for subtracting the angular displacement between said tracking reticle image and said zero deflection line of sight from the angular displacement between the target and said optical axis at the input end of said auxiliary optical system to thereby orient the target image and reference reticle configuration as observed from said second reference position in the same relationship that the target and said tracking reticle image are oriented as observed through said combining glass from said first reference position.

3. The combination as set forth in claim 2, wherein said adjustable prediction mirror means and said further adjustable mirror means are provided by a mirror having reflecting faces on opposite sides thereof, one face for reflecting a reticle image to said combining glass and the other face for reflecting a target image provided in said auxiliary optical system for observation from said second reference position, said mirror being semi-transparent for passage therethrough of an image of said reticle for providing said reference reticle configuration fixedly centered about said axis through said second reference position.

4. The combination as set forth in claim 2, wherein said adjustable prediction mirror means is provided by a first mirror which is rotatable about a first predetermined point, said further adjustable mirror means being provided by a second mirror which is rotatable about a second predetermined point fixedly displaced from said first point, and means connecting said mirrors together for simultaneous adjustment.

5. In combination, a light source, a reticle, a lens, a mirror and a combining glass providing a basic optical system for providing a reticle image, said mirror having first and second reflecting faces on opposite sides thereof with said first face being disposed within said basic optical system for reflecting light days defining said reticle image to said combining glass for observation of said image from a first predetermined reference position fixed with respect to said combining glass, means for adjustably orienting said mirror about a predetermined point fixedly displaced from said combining glass, said mirror having a predetermined zero reference orientation about said point to locate the reticle image as observed from said first reference position along a zero line of sight passing through a predetermined point on said combining glass, said mirror being semi-transparent for passage therethrough of light rays from said light source for defining a fixed reference reticle image for observation from a second predetermined reference position fixedly displaced from said first reference position, and an auxiliary optical system for viewing a target from a location which is fixedly displaced from said zero line of sight and providing target images for observation from said second reference position, said auxiliary optical system having an optical axis at its input end which is substantially parallel with said zero line of sight, said second reflecting face of said mirror being disposed within said auxiliary optical system for reflecting target image defining light rays so that the orientation between a target image and said reference reticle image as observed from said second reference position corresponds with the orientation between the target and the reticle image as observed through said combining glass from said first reference position.

6. In combination, a light source, a reticle, a lens, a first mirror and a combining glass providing a basic optical system for providing a reticle image for observation from a first reference position fixed with respect to said combining glass, means for adjustably rotating said first mirror about a predetermined point to locate a reticle image as observed from said first reference position along a zero line of sight passing through a predetermined point on said combining glass, means for providing a fixed reference reticle image for observation from a second predetermined reference position fixedly displaced from said first reference position, and an auxiliary optical system for viewing a target from a location which is fixedly displaced from said zero line of sight and providing an image of said target at said second reference position, said auxiliary optical system having an optical axis at its input end which is substantially parallel with said zero line of sight, a second adjustably rotatable mirror being disposed within said auxiliary optical system, and adjustable means interconnecting said first and second mirrors to orient a target image relative to said reference reticle image as observed from said second reference position in correspondence with the orientation between the target and the reticle image as observed through said combining glass from said first reference position.

References Cited in the file of this patent

UNITED STATES PATENTS

| | | |
|---|---|---|
| 2,464,195 | Burley | Mar. 8, 1949 |
| 2,549,030 | Stewart | Apr. 17, 1951 |
| 2,577,785 | Lyon | Dec. 11, 1951 |
| 2,609,606 | Draper | Sept. 9, 1952 |